UNITED STATES PATENT OFFICE.

EMILE LANGUEPIN, OF PARIS, FRANCE.

ELECTRODE FOR ELECTRIC-ARC WELDING.

1,302,386.   Specification of Letters Patent.   Patented Apr. 29, 1919.

No Drawing.   Application filed November 13, 1917.   Serial No. 201,803.

*To all whom it may concern:*

Be it known that I, EMILE LANGUEPIN, citizen of the French Republic, residing at Paris, in the Department of the Seine and State of France, have invented certain new and useful Improvements in Electrodes for Electric-Arc Welding, of which the following is a specification.

Various difficulties are encountered in electric welding according to the Slawianoff arc system: welding with alternating currents is impossible and particular skill must be exercised to regularly weld with direct current.

To permit operation with alternating current and facilitate the working with direct current, the arc should be able to start again by itself at each period or whenever it has been occasionally blown out. This result is attained if the temperature of the end of the electrode is maintained sufficiently high to insure the surrounding air being ionized so as to create a current of electrons issuing from the incandescent cathode and forming a conduction path for the new arc. The intensity of this current of electrons being, according to Richardson, an exponential function of the temperature, a thermal protection comparatively slight will be sufficient to insure a temperature sufficiently high to enable the arc starting again. On the other hand, it is desirable to maintain the end of the electrode at a maximum temperature to reduce the heat losses and also to maintain the surrounding atmosphere as highly conductive as possible. The influence of the temperature is particularly effective on the variation of the resistance at the contact of the electrode with the gaseous medium and consequently the electrode should be protected against cooling by means of a sheath which should present the following features:

Said electrode sheath or covering should be perfectly homogeneous and compact and should not be susceptible of disintegration so that the end of the electrode will be always well protected and the pieces of the electrode sheath dropped into the molten metal shall not be incorporated with the deposited metal. The electrode sheath should also practically be sufficiently infusible so as to prevent the formation of a slag which might flow either onto the electrode end or onto the deposited metal with which it would be mixed and give objectionable inclusions of slags. The sheath should also wear away regularly together with the electrode so as to exactly keep the same length as the latter to suitably protect the end of the electrode and prevent the formation of a crater or cup which might interfere with the arc and prevent the arc starting again with alternating current. The electrode sheath should also be made of a material having a boiling point exceedingly close to its melting point and slightly below the temperature of the arc, whereby said material will be entirely volatilized and give out vapors which will condensate upon the cooler parts of the element to be welded. Since the condensation cannot occur in contact with the molten metal, no introduction of slag into the deposited metal can take place. The small amount of the sheath material which might become melted should also remain in a sufficiently viscous condition to adhere to the end of the electrode and form at the most around said end an annular projection which does not extend farther lengthwise and whereby a thermal protection of said electrode end is secured. The sheath should have no chemical action on the metal inclosed by it and should remain as poor a conductor as possible of heat and electricity at all temperatures. The boiling and melting temperatures of the sheath should be by 200 to 300° C. higher than the melting temperature of the metal forming the electrode, whereby the penetration of the electrode or adjunct metal into the part to be welded and also the strength of the welding are increased.

The above results are obtained by the use of a sheath or covering made of pure kaolin, the boiling point of which is very close to the melting point which latter is itself very high and approximately 1816° C. It is very important to use as pure a kaolin as possible, an addition of lime for instance causing a very rapid decrease in the melting temperature which may drop as low as 1380° and causing the formation of a slag which may become inlaid in the adjunct metal.

The sheath used is very thin five-tenths of a millimeter at the most, so as to prevent also the formation of a cup which would interfere with the starting of the arc with alternating current.

Claims:

1. An electrode for electric arc welding, composed of a rod of metal and a sheath covering said rod, said sheath being perfectly homogeneous and compact, not easily fusible, having a boiling temperature sufficiently close to its melting temperature to prevent any formation of slag, the sheath being in operation entirely volatilized and only giving out vapors which condense upon the cool surface of the object to be welded without mixing with the molten metal.

2. An electrode for electric arc welding comprising a metallic rod and a sheath of kaolin covering said rod.

In testimony whereof I affix my signature in presence of two witnesses.

LANGUEPIN EMILE. [L. S.]

Witnesses:
 LUCIEN CRESPIN,
 E. SAUPETIC.